(12) United States Patent
Thirumalai et al.

(10) Patent No.: US 9,195,714 B1
(45) Date of Patent: Nov. 24, 2015

(54) IDENTIFYING POTENTIAL DUPLICATES OF A DOCUMENT IN A DOCUMENT CORPUS

(75) Inventors: Srikanth Thirumalai, Clyde Hill, WA (US); Aswath Manoharan, Bellevue, WA (US); Mark J. Tomko, Seattle, WA (US); Grant M. Emery, Seattle, WA (US); Vijai Mohan, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 143 days.

(21) Appl. No.: 13/030,114

(22) Filed: Feb. 17, 2011

Related U.S. Application Data

(63) Continuation of application No. 11/952,020, filed on Dec. 6, 2007, now Pat. No. 7,895,225.

(51) Int. Cl.
*G06F 17/30* (2006.01)
(52) U.S. Cl.
CPC .... *G06F 17/30528* (2013.01); *G06F 17/30483* (2013.01)
(58) Field of Classification Search
CPC .............. G06F 17/30864; G06F 17/30528; G06F 17/30483; G06Q 30/02
See application file for complete search history.

(56) References Cited

U.S. PATENT DOCUMENTS

| | | | |
|---|---|---|---|
| 4,849,898 A | 7/1989 | Adi | |
| 5,062,074 A | 10/1991 | Kleinberger | |
| 5,261,112 A | 11/1993 | Futatsugi | |
| 5,634,051 A * | 5/1997 | Thomson | 1/1 |
| 5,835,892 A | 11/1998 | Kanno | |
| 5,960,383 A | 9/1999 | Fleischer | |
| 6,038,561 A | 3/2000 | Snyder | |
| 6,075,896 A | 6/2000 | Tanaka | |
| 6,076,086 A | 6/2000 | Masuichi | |
| 6,167,398 A | 12/2000 | Wyard | |

(Continued)

FOREIGN PATENT DOCUMENTS

EP    1 380 966 A2    1/2004

OTHER PUBLICATIONS

Ghahramani, Z., et al., "Bayesian sets," in Y. Weiss, et al. (eds.), "Advances in Neural Information Processing Systems 18 (Proceedings of the 2005 Conference)," MIT Press, May 2006, 8 pages.

(Continued)

*Primary Examiner* — Loan T Nguyen
(74) *Attorney, Agent, or Firm* — Robert C. Kowert; Meyertons, Hood, Kivlin, Kowert & Goetzel, P.C.

(57) ABSTRACT

According to aspects of the disclosed subject matter, a method for identifying a set of documents from a document corpus that are potential duplicates of a source document, is provided. A source document is obtained. A list of queries corresponding to the source document is identified. Each query in the identified list of queries is executed on the document corpus, wherein the execution of each query yields a corresponding results set identifying an ordered set of documents in the document corpus. For each document identified in each results set, a document score is generated for the identified document based on the identified document's ordinal position in its results set. A subset of the identified documents of the results set is selected according to the generated document scores that satisfy predetermined selection criteria. The selected subset of identified documents are stored or displayed.

20 Claims, 6 Drawing Sheets

(56) References Cited

U.S. PATENT DOCUMENTS

| | | | |
|---|---|---|---|
| 6,173,251 B1 | 1/2001 | Ito | |
| 6,263,121 B1 | 7/2001 | Melen | |
| 6,606,744 B1 | 8/2003 | Mikurak | |
| 6,810,376 B1* | 10/2004 | Guan et al. | 704/9 |
| 6,961,721 B2 | 11/2005 | Chaudhuri | |
| 7,113,943 B2 | 9/2006 | Bradford | |
| 7,346,839 B2* | 3/2008 | Acharya et al. | 1/1 |
| 7,386,441 B2 | 6/2008 | Kempe | |
| 7,426,507 B1 | 9/2008 | Patterson | |
| 7,529,756 B1 | 5/2009 | Haschart | |
| 7,562,088 B2 | 7/2009 | Daga | |
| 7,567,959 B2* | 7/2009 | Patterson | 1/1 |
| 7,599,914 B2* | 10/2009 | Patterson | 1/1 |
| 7,603,345 B2* | 10/2009 | Patterson | 1/1 |
| 8,046,372 B1* | 10/2011 | Thirumalai et al. | 707/749 |
| 8,166,045 B1* | 4/2012 | Mazumdar et al. | 707/748 |
| 2002/0016787 A1 | 2/2002 | Kanno | |
| 2003/0028564 A1* | 2/2003 | Sanfilippo | 707/513 |
| 2003/0065658 A1 | 4/2003 | Matsubayashi | |
| 2003/0101177 A1* | 5/2003 | Matsubayashi et al. | 707/6 |
| 2003/0130998 A1* | 7/2003 | Fox et al. | 707/3 |
| 2006/0112128 A1 | 5/2006 | Brants | |
| 2006/0282415 A1 | 12/2006 | Shibata | |
| 2007/0085716 A1* | 4/2007 | Bar-Yossef et al. | 341/87 |
| 2008/0140653 A1* | 6/2008 | Matzke et al. | 707/6 |
| 2008/0228750 A1* | 9/2008 | Zaragoza | 707/5 |
| 2008/0243842 A1* | 10/2008 | Liang et al. | 707/6 |
| 2011/0047153 A1* | 2/2011 | Betz | 707/723 |
| 2012/0290597 A1* | 11/2012 | Henzinger | 707/758 |
| 2012/0310902 A1* | 12/2012 | Patterson | 707/692 |

OTHER PUBLICATIONS

"Google(TM) Sets," (c)2007 Google, <http://labs.google.com/sets> [retrieved Feb. 13, 2008].

Bilenko, M., et al., "Adaptive Name Matching in Information Integration," IEEE Intelligent Systems 18(5):16-23, Sep./Oct. 2003.

Kilgarriff, A., "Using Word Frequency Lists to Measure Corpus Homogeneity and Similarity Between Corpora," Information Technology Research Institute Technical Report Series, ITRI-97-07, Univ of Brighton, U.<., Aug. 1997, 16 pages.

"Ordinal," American Heritage Dictionary of the English Language, 3rd Ed., Houghton Mifflin Company, New York, 2006, p. 1238.

Ramos, J., "Using TF-IDF to Determine Word Relevance in Document Queries," Proceedings of the First Instructional Conference on Machine Learning (iCML-2003), Piscataway, N.J., Dec. 3-8, 2003, 4 pages.

* cited by examiner

IDENTIFYING POTENTIAL DUPLICATES OF A DOCUMENT IN A DOCUMENT CORPUS

This application is a continuation of U.S. application Ser. No. 11/952,020, which was filed on Dec. 6, 2007.

BACKGROUND

One aspect associated with the widespread usage of networks generally, and the Internet particularly, has been the emergence of electronic marketplaces. An electronic marketplace is typically a network site that offers a consistent, seemingly united, electronic storefront to networked consumers. Typically, the electronic marketplace is hosted on the Internet as one or more Web pages, and viewed by a consumer via a networked computer. FIG. 1 is a pictorial diagram of an illustrative networked environment 100 that includes an electronic marketplace. In particular, the networked environment 100 includes a host server 102 that hosts the electronic marketplace 104. As indicated above, a typical electronic marketplace is comprised of one or more Web pages that are viewable on a consumer's computer via a Web browser. However, for illustration purposes, the electronic marketplace 104 is shown in FIG. 1 as residing "outside" of a client computer. Consumer computers, such as consumer computers 106-108, connect to the host server to access the electronic marketplace via a network 110, such as, but not limited to, the Internet. The electronic marketplace 104 allows consumers, via their client computers 106-108, to view and purchase items offered for sale or lease on the electronic marketplace.

In many instances, an electronic marketplace 104 includes items from many different vendors or suppliers. For example, as shown in FIG. 1, the electronic marketplace 104 offers items from vendors 112 and 114. Still further, these electronic marketplaces allow individuals to offer both new and used items to consumers via the electronic marketplace. To do so, the vendors/suppliers 112-114, as well as consumers, such as a consumer operating consumer device 108, provide descriptions of products to be offered on the electronic marketplace 104 to the host server 102. The illustrated descriptions include descriptions 120-124.

Naturally, if an item is offered through the electronic marketplace 104, all instances of that item from all vendors should be displayed to the consumer as various options of the same item rather than individual items that are viewed separately. Unfortunately, since individual vendors and consumer/sellers provide the host server 102 with their own descriptions of the products that they wish to sell, it becomes an onerous, manual task to determine which product descriptions reference the same items such that the various options of an item are displayed together. Further, as the size of the electronic marketplace grows, and the number of product descriptions increases, this manual task becomes even more time consuming.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
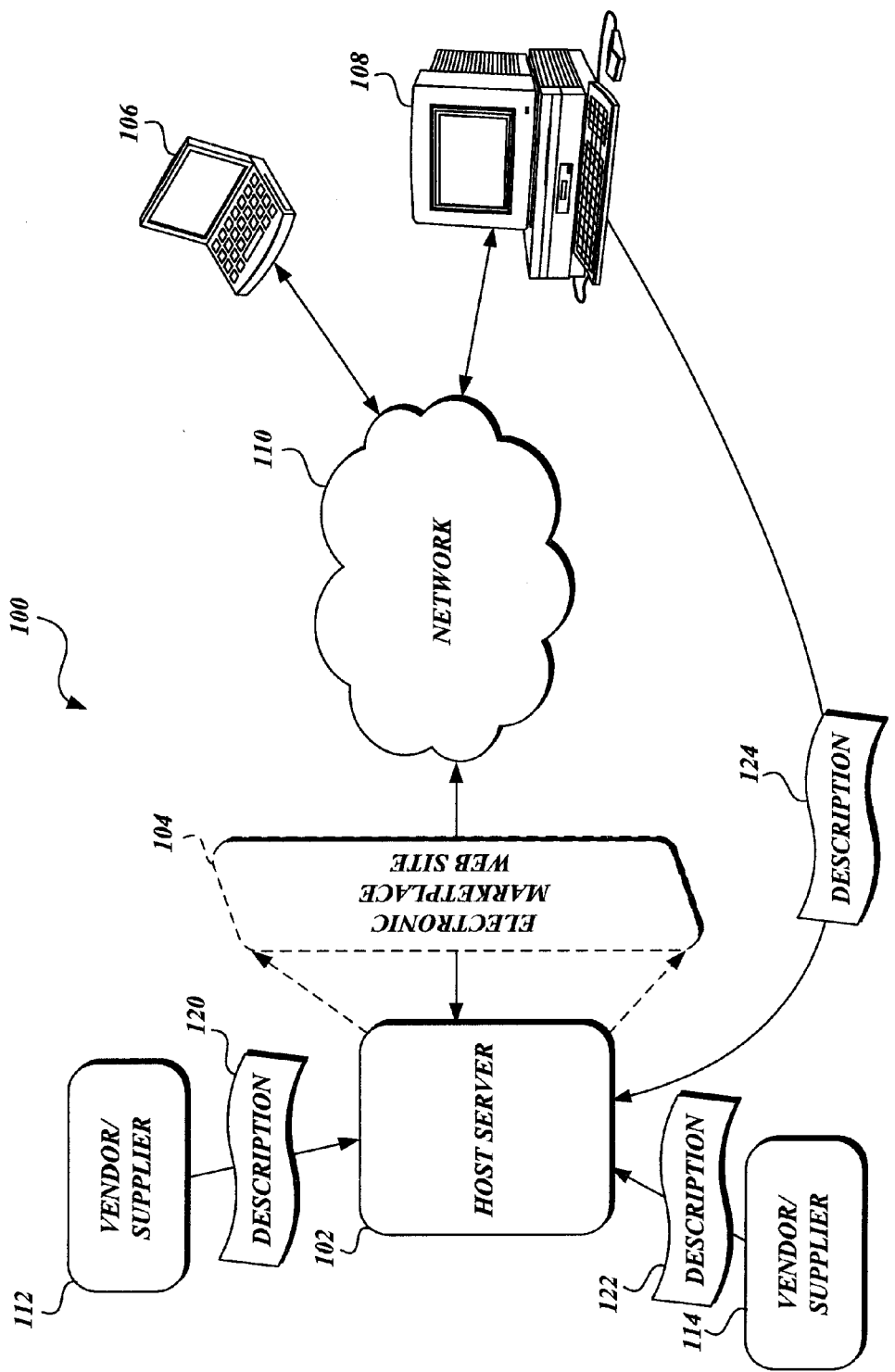
FIG. 1 is a pictorial diagram of an illustrative networked environment providing an electronic marketplace.

By way of definition and as used herein, a document is a body of text generally directed to describing particular subject matter. A product description is a document that is directed to describing a particular item, such as an item for sale by an online marketplace. For example, a product description of a digital camera would typically include information such as the camera's manufacturer, a product number for the camera, various technical features, cosmetic features, and the like.

As further definition, a document corpus refers to a collection of documents. According to various embodiments, a document corpus may be stored in one or more data stores or catalogues. In regard to the following discussion, the referenced document corpus is a collection of product descriptions of products offered for sale by various providers, though this is only one example and should not be viewed as limiting upon the disclosed subject matter. The product descriptions are generally provided to a host server 102 that manages a document corpus in conducting an electronic marketplace 104 for consumers.

By way of further definition, while in the following discussion mention will frequently be made in regard to determining whether a first document is a duplicate of another document, this is a shorthand reference to determining whether the subject matter described by the first document is the same, or substantially the same, subject matter described by another document, such as documents in the document corpus. In other words, when the subject matter described by one document is the same or substantially similar to the subject matter described by another document or documents, these documents are said to be "duplicates."

A system and method for identifying potential/candidate duplicate documents in a document corpus for a given document is presented. Generally, a given document/product description is received and it is desirable to identify potential duplicate documents in a document corpus of the given document. Search queries are identified using different sets of attributes, words, terms, phrases, and the like, from the given document. The identified search queries are executed using a relevance search engine. Relevance searching and relevance search engines are known in the art. More particularly, as those skilled in the art will appreciate, the results returned from a relevance search by a relevance search engine are associated with a relevance value that can be used to order or rank the results. For example, a relevance search run on a document corpus by a relevance search engine responsive to a search query using various terms from a given document as criteria will yield a set of references to documents in the document corpus that bear some relevance to the search criteria, and each reference in the results set will be associated with a relevance value indicative of the reference's relevance to the criteria as determined by the relevance search engine. Additionally, either from an empirical examination of the results set or as a function of the search engine, the number of references in the results set is also available.

As will be described in greater detail below, as part of identifying potential duplication documents in the document corpus for a given document, each document identified in each search results set is scored. The score is determined as a function of the document's rank in its results set (according to its relevance value) and the number of documents identified in the results set. This score is referred to as the "rank specificity score" of the returned product. A set of potential duplicates is then created from the documents whose rank specificity score meets predetermined selection criteria.

Figure 2:
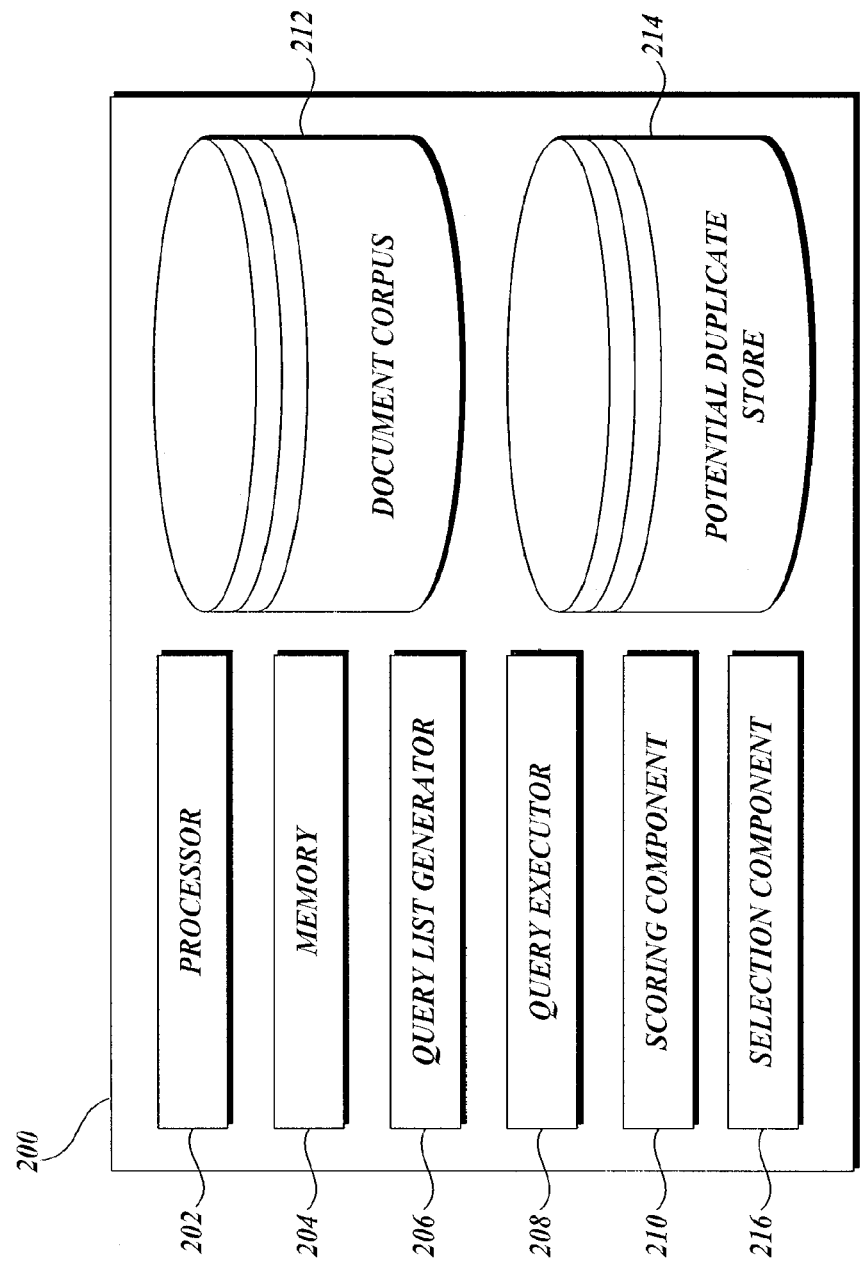
FIG. 2 is a block diagram illustrating logical components of a computing device suitable for identifying potential duplicate documents in a document corpus in accordance with aspects of the disclosed subject matter.

FIG. 2 is a block diagram illustrating logical components of a computing device 200 suitable for identifying potential duplicate documents in a document corpus for a given document in accordance with aspects of the disclosed subject matter. Of course, as suggested, it should be appreciated that the components described herein are logical components and not necessarily actual components. In an actual embodiment, any one or all of the logical components may be embodied in one or more discrete actual components, and/or combined with several components. Moreover, an actual computing device configured according to aspects of the disclosed subject matter will include additional components that are not disclosed herein.

As shown in FIG. 2, the computing device 200 includes a processor 202 for executing computer-executable instructions, including instructions to identify potential duplicates documents in a document corpus for a given document. The computing device 200 also includes a memory 204 for storing information including executable instructions for the processor 202 and corresponding data. The memory 204 may be comprised of random access memory (RAM), read-only memory (ROM), disk storage, remote online storage, and the like.

The illustrated computing device 200 also includes various executable modules for performing aspects of identifying potential duplicate documents for a given document. These executable modules include query list generator 206 and a query executor 208. The query list generator 206 generates a list of search queries for a given document. In one embodiment, the query list generator 206 generates a list of search queries using various terms, phrases, words, model numbers, attributes, and the like, in the given document. Further still, in alternative embodiments, the query list generator 206 may further obtain predetermined search queries in addition to, or as an alternative to, generating search queries from the given document. As suggested above, the search queries, when executed by a relevance search engine, return search results sets referencing documents in a document corpus that are evaluated as potential duplicate documents for the given document.

The query executor 208 is used to execute the various search queries generated and/or obtained by the query list generator 206. The query executor 208 executes the search queries in conjunction with a relevance search query engine (not shown). The executable modules further include a scoring component 210 and a selection component 216. The scoring component 210 generates rank specificity scores for the documents in the results sets, and the selection component 216 creates a set of potential/candidate duplicate documents corresponding to the given document by selecting documents identified in the results sets according to their rank specificity scores.

Those skilled in the art will appreciate that in an actual embodiment, each executable module identified above may be implemented as one or more hardware components, software components, a combination of hardware and software components, a service provided by another computing device, and the like. Moreover, while shown as residing outside of the memory 204, if an executable module is implemented as a software component (at least in part), it would like be found within the memory. Accordingly, the arrangement of the executable modules should be viewed as illustrative only, and not construed as limiting upon the disclosed subject matter.

The computing device 200 is also illustrated as including a document corpus 212. As indicated above, the document corpus 212 is a collection of documents, such as product descriptions of items or services for sale on an electronic marketplace. The document corpus 212 may be organized in a database as illustrated in FIG. 2, though this is illustrative only. In alternative embodiments, the document corpus 212 may be implemented in a variety of arrangements and/or configurations such as a file system, an electronic library, an electronic service, and the like. Moreover, while the document corpus 212 is illustrated as being a part of the computing device 200, in an actual embodiment, the document corpus 212 may be stored external to, though communicatively accessible by, the computing device 200.

The computing device 200 is also illustrated as including a potential duplicate store 214. The potential duplicate store 214 stores the sets of potential duplicates generated by the selection component 216. These sets may then be retrieved, either by a user or an automated process, for further evaluation and disposal as duplicate documents. As with the document corpus 212, while illustrated as a logical component of the computing device 200, in an actual embodiment, the potential duplicate store 214 may be located external to, though accessible by, the computing device 200.

Figure 3A:
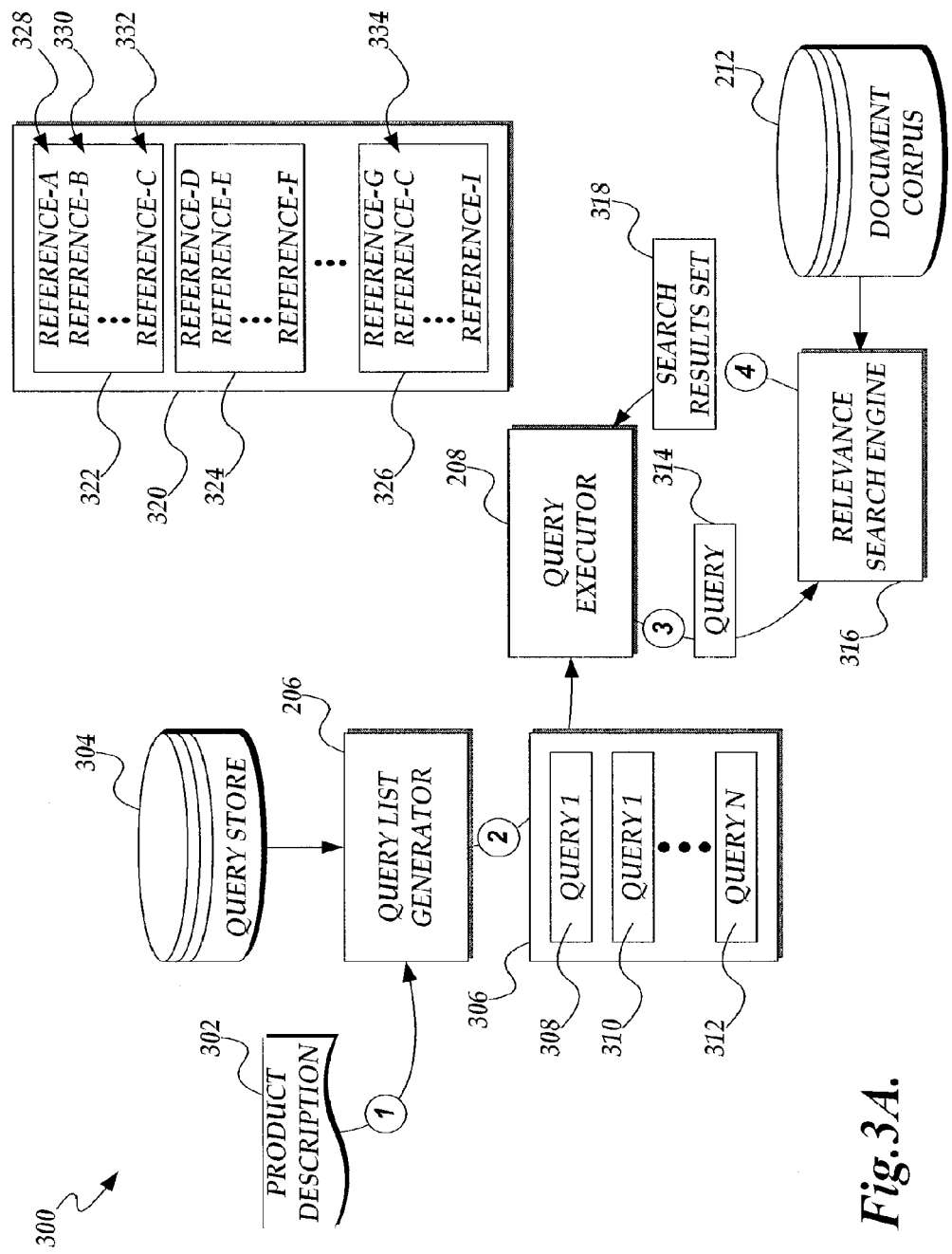
FIGS. 3A and 3B illustrate various stages of determining a set of candidate/potential duplicate documents in a document corpus for a corresponding document in accordance with aspects of the disclosed subject matter.
Figure 3B:
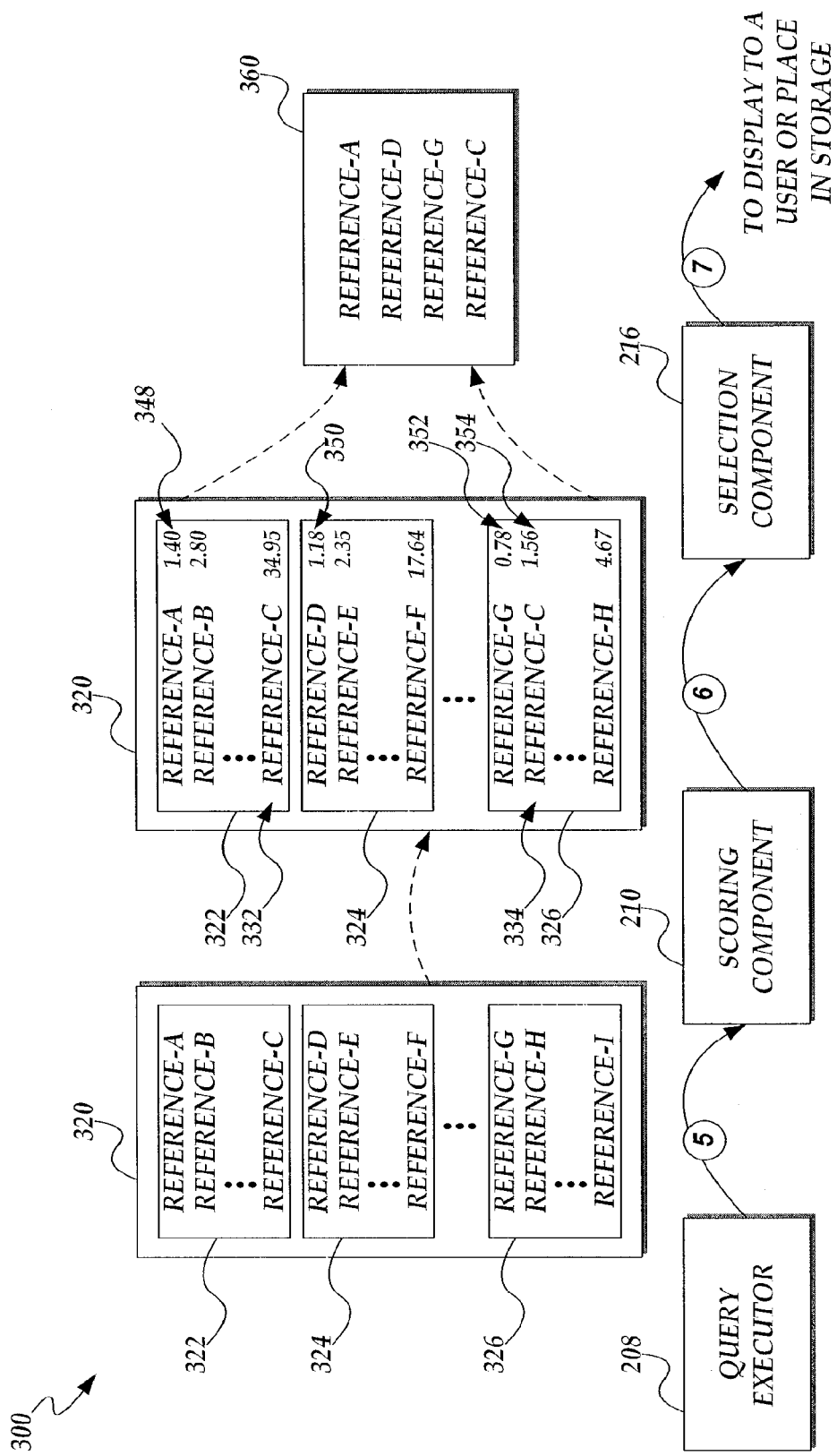

FIGS. 3A and 3B illustrate various stages of determining a set of candidate/potential duplicate documents in a document corpus 212 for a corresponding document, in accordance with aspects of the disclosed subject matter. Turning first to FIG. 3A, to begin, a product description 302 is obtained and provided to the query list generator 206, as indicated by arrow 1. Based on the product description 302, the query list generator 206 then generates a list 306 of queries 308-312 to be executed on the document corpus 212. According to various embodiments, the query list generator 206 may produce the list 306 of queries by deriving the list from terms, words, phrases, and the like that are found the product description 302, and/or may obtain a predetermined set of queries from a query data store 304. By way of example only, the query list generator 206 identifies a list 306 that includes three search queries 308-310 for execution by a relevance search engine 316 on the document corpus 210. It should be appreciated, however, that any number of queries may be generated or provided by the query list generator 206 for a given product description 302.

The query list 306 is passed to the query executor 210, as indicated by arrow 2. As mentioned above, the query executor 210 executes each of the queries (as illustrated by arrow 3 and query 314) in the query list on a relevance search engine 316 that has access to the document corpus 212. In response to executing a query 314, the relevance search engine 316 returns a search results set (as illustrated by arrow 4 and search results set 318) to the query executor 210. These search results sets are collected (as indicated by box 320) for further processing. As illustrated in FIG. 3, for example purposes only, in response to executing the three queries 308-314 in the query list 306, the query executor 210 receives three search results sets 322-326 (corresponding to queries 310-314, respectively) from the relevance search engine 316.

While not shown among the various search results sets 322-326, as indicated above, each result in each results set will be associated with a relevance value, this relevance value indicating the relevance of the result to the search query, as determined by the relevance search engine 316. Using these relevance values, the documents in the results set can be placed in order. For illustration purposes, it is assumed that the search results of each search results set 322-326 in box 320 is displayed in order according to the relevance value. Thus, in regard to search results set 322, result 328 is the first (having the highest relevance value), result 330 is second highest, and result 332 has the lowest relevance value (its actual position depending on the number of search results in the search results set). Each search results set, such as search results set 322, will have a count of results which is identified by the relevance search engine 316 or determined by empirical examination. With regard to the illustrated search results sets 322-326, while each search results set seems to include references to three documents in the document corpus 212, this is for illustration purposes and should not be construed as limiting upon the disclosed subject matter. Indeed, each search results set may include any number of results.

It should be noted that a reference to a document may occur in more than one search results set. For example, result 332 in search results set 322 refers to the same document as result 334 in search results set 326. As will be discussed later, when this occurs, a reference to the same document receives the minimum rank specificity score for that document from all of the search results set.

While only one relevance search engine is displayed, it should be appreciated that the query executor 208 may execute any and all of the search queries 308-314 on any number of relevance search engines. Moreover, information from the query store 304 may include instructions as to which search query to execute on which relevance search engine. Accordingly, the display of a single relevance search engine 316 should be viewed as illustrative only, and not limiting upon the disclosed subject matter.

Turning now to FIG. 3B, after having executed the search queries 306 and received search results sets 322-326 from the relevance search engine 316, the search results sets are delivered to a scoring component 210, as indicated by arrow 5. The scoring component 210 generates a rank specificity score for each of the results in each search results set 322-326. For example, as shown in FIG. 3B, box 340 illustrates scored search results sets 322-326 that correspond, respectively, to the search results sets 322-326 found in box 320. While any number of algorithms may be used to determine a rank specificity score derived from the ordering of the results and the number of results in a search results set, an illustrative algorithm is "score(result)=rank(result)*log(resultsSetCount)", where "score(result)" is the rank specificity score for the result in a search results set, "rank(result)" is the ordinal position of the result in the search results set according to the relevance value of the result, and "resultsSetCount" corresponds to the number of results in the particular search results set.

The rank specificity scores shown in the search results sets 322-326 in box 340 of FIG. 3B are based on the following exemplary numbers: search results set 322 has 25 results; search results set 324 has 15 results; and search results set 326 has only 6 results. Using this information, the rank specificity score 348 is determined as: "1*log(25)" or "1.40." The rank specificity score 350 is determined as follows: "1*log(15)" or "1.18." Further, the rank specificity scores 352 and 354 are determined as follows: "1*log(6)" or "0.078," and "2*log(6)" or "1.56."

Of note is result 332 of search results set 322 which is a reference to the same document as result 334 in search results set 326. Due to its position in search results set 322 and the count of search results set 322, result 332 has a rank specificity score of "34.95" while the position of result 334 in search results set 326 and the count of search results set 326 yields a rank specificity score of "1.56." As mentioned above, when the same document receives different scores, the best/lowest score is applied to the document universally, or at least when selecting potential/candidate duplicate documents as set forth below.

Once the results of each search results set are scored with a rank specificity score, the search results sets 322-326 are provided to a selection component 216, as indicated by arrow 6, that selects those results that satisfy predetermined selection criteria. According to one embodiment, the selection criteria as applied by the selection component 216, may be based on an absolute value, such that those results that fall below an absolute value are included as potential duplicate documents. Alternatively, the selection criteria may be based on a percentage of each search results set, or an overall percentage of search results. The set of results 360, now considered potential duplicate documents, that satisfy the predetermined selection criteria are provided to a user for evaluation as actual duplicate documents, as indicated by arrow 7. Alternatively, the set of results 360 may be stored in the potential duplicate store 214 for subsequent retrieval, such as by a user or an automated evaluation process.

Figure 4A:
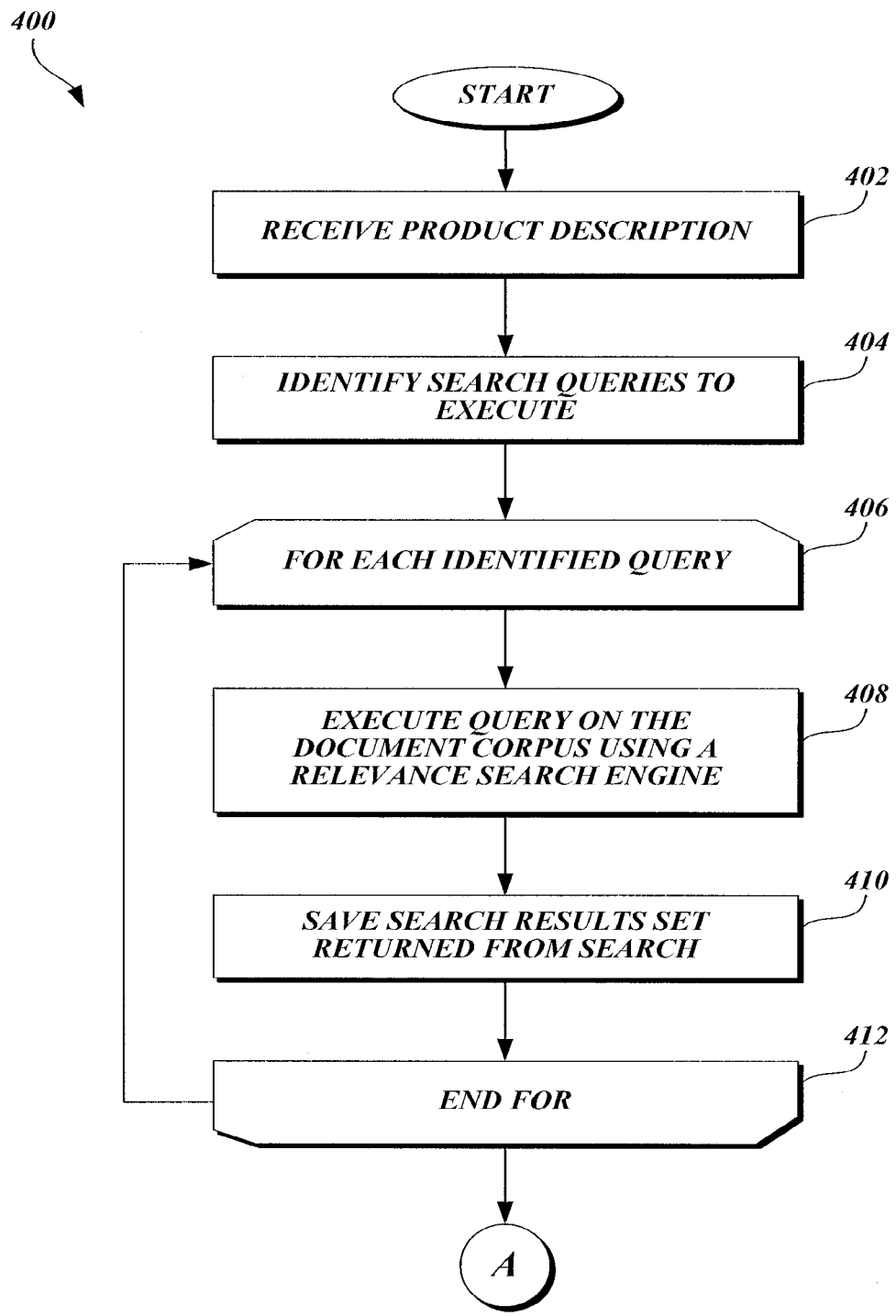
FIGS. 4A and 4B are flow diagrams of an illustrative routine for identifying potential duplicate documents according to aspects and embodiments of the disclosed subject matter.
Figure 4B:
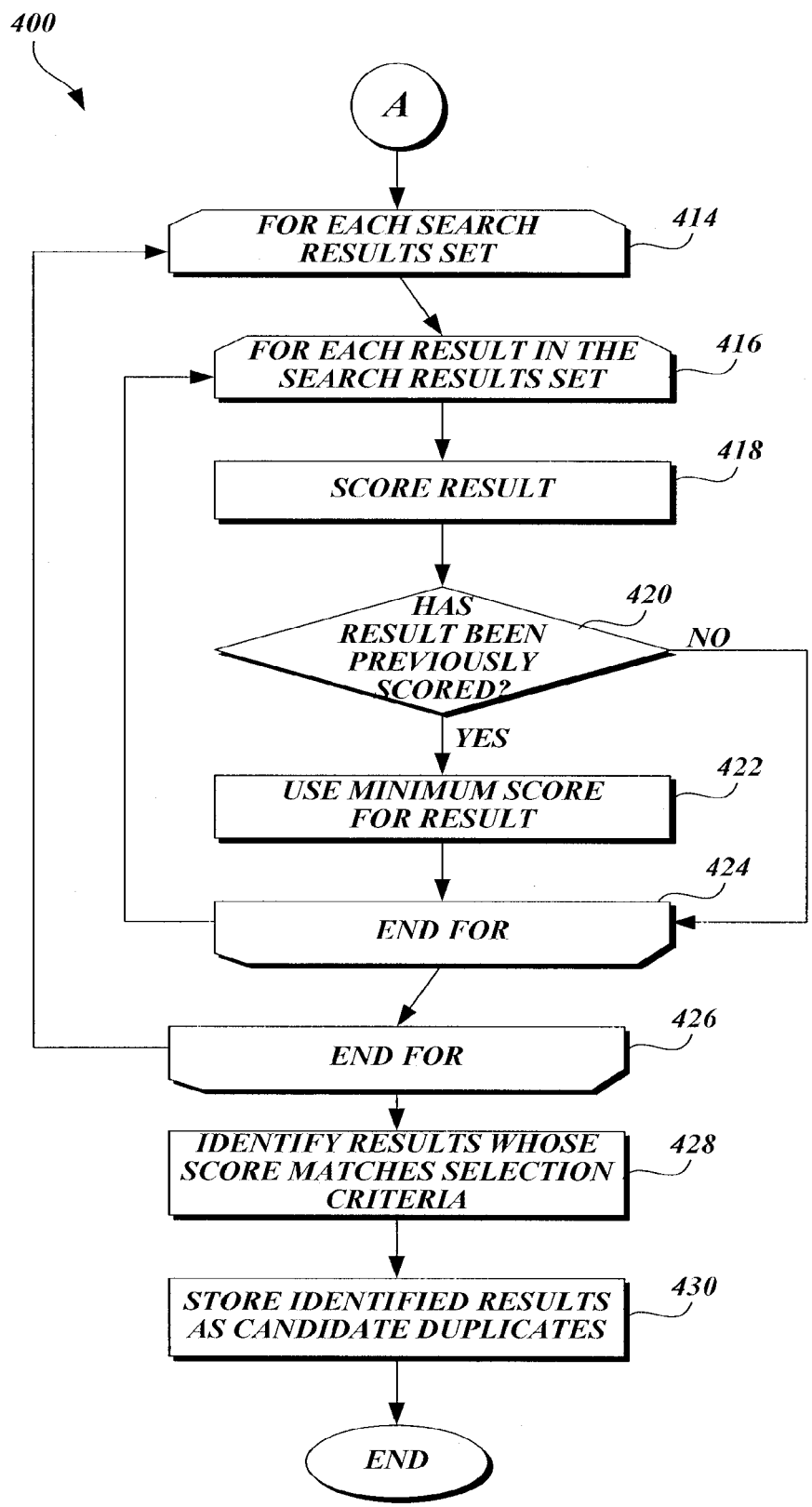

FIGS. 4A and 4B are a flow diagram of an illustrative routine for selecting candidate duplicate documents from a document corpus 212, according to aspects and embodiments of the disclosed subject matter. Beginning at block 402, a product description 302 is received. At block 404, search queries relating to the product description 302 are identified. Thereafter, at control block 406, an iterative/looping process is begun that iterates through each of the search queries identified in block 404. This iterative process includes the steps in blocks 408 and 410, and returns to the beginning of the iterative process 406 from end block 412 while there are more search queries that have not been executed. Thus, for each search query in the identified list of queries, at block 408 the search query is executed on a relevance search engine 316. At block 410 the search results set returned from the search is saved. At the end of the iterative process 412 (when there are no more queries to process), the routine 400 proceeds through Circle A to control block 414 (FIG. 4B).

With reference now to FIG. 4B, at control block 414, an iterative/looping process is begun that iterates through each search results set returned from the relevance search engine 316 in response to executing the search queries. The iterative process ends at end control block 426, encompassing blocks 416-428, and returns to control block 414 while there are unprocessed search results sets.

At control block 416 another iterative process is begun to score the results of the search results set. This iterative process includes the steps of block 418-420, and ends with end control block 424. The routine 400 returns from end control block 424 to control block 416 while there are un-scored results in the search results set.

At block 418, the result in the search results set is given a rank specificity score that is a function of the rank of the result in the search results set (as determined by the relevance of the result to the search query) and the number of results in the search results set. In one embodiment, the rank specificity score is determined according to the formula: score(result)=rank(result)*log (resultsSetCount).

At decision block 420, a determination is made as to whether this particular result was included and already scored in another search results set. If so, the routine 400 proceeds to block 422 where the minimum of the scores determined for this particular result among all search results sets is used for this result in all of the search results sets. Thereafter, or if the result has not previously been scored in another search results set, the routine proceeds to end control block 424 where the routine returns to control block 416 if there are more un-scored results in the current search results set.

After all results of a current results set have been scored, the routine 400 proceeds to end control block 426. At end control block 426, the routine 400 returns to control block 414 if there are any un-scored search results sets. Otherwise, the routine 400 proceeds to block 428 where those results, from all of the search results sets, that satisfy predetermined selection criteria are identified and added to a set of potential duplicate documents. At block 430, the set of candidate potential documents is stored in a potential duplicate store for further evaluation, either by a user or by another automated process to determine whether the potential duplicate documents are actual duplicate documents. Thereafter, the routine 400 terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method, comprising:
 performing, by one or more computers,
  initiating, based on receiving a source document, a routine for identifying one or more candidate duplicate documents of the source document from a document corpus, said identifying comprising:
   receiving the source document, wherein a document type of the source document is the same as a document type of at least some of a plurality of reference documents in the document corpus;
   determining a plurality of different queries from content of the source document;
   executing the plurality of different queries on the document corpus in response to receiving the source document, wherein the plurality of different queries differ from one another by at least one search term, wherein individual queries of the plurality of different queries produce a respective list of documents that identifies at least some of the plurality of reference documents of the document corpus, wherein the respective reference documents of the respective lists of documents are scored at least in part with respect to the source document;
   based, at least in part, on scores for the reference documents from at least two of the respective lists, selecting one or more of the reference documents having a respective score that meets a score threshold as potential duplicates of the same received source document that initiated the routine; and
   storing an identification of the one or more potential duplicate documents.

2. The method of claim 1, further comprising:
 performing, by said one or more computers,
  prior to said executing the different queries, determining one or more of the different queries based on at least one of a term, word, or phrase within the source document.

3. The method of claim 1, further comprising:
 performing, by said one or more computers,
  prior to said executing the different queries, determining one or more of the different queries based on a set of stored queries.

4. The method of claim 1, wherein at least one of the different queries is configured to score a reference document based on the reference document's relevance with respect to the source document.

5. The method of claim 4, wherein the at least one of the different queries is further configured to score the reference document based on a number of reference documents identified in the at least one query's respective list of documents.

6. The method of claim 1, further comprising:
 performing, by said one or more computers,
  prior to said determining that one or more reference documents are potential duplicates of the received source document, determining that a reference document is identified in two or more of the lists of documents, the two or more lists of documents having a respective different score for the reference document; and
 assigning the highest of the different scores to the reference document.

7. The method of claim 1, wherein the score threshold is an absolute score threshold applied to a collection of the identified reference documents.

8. The method of claim 1, wherein the score threshold is a relative score threshold applied to a collection of the identified reference documents.

9. A non-transitory computer-readable storage medium having program instructions stored thereon that, in response to execution by a computer system, cause the computer system to perform operations comprising:
 initiating, based on receiving a source document, a routine for identifying one or more candidate duplicate documents of the source document from a document corpus, said identifying comprising:
  receiving the source document, wherein a document type of the source document is the same as a document type of at least some of a plurality of reference documents in the document corpus;
  determining two or more different queries, from content of the source document;
  in response to receiving the source document, executing the two or more different queries on the document corpus, wherein the two or more different queries differ from one another by at least one search term, wherein individual ones of the two or more different queries return a respective list of reference documents that identifies at least some of the plurality of reference documents of the document corpus, and wherein the respective reference documents identified in the respective lists are associated with a respective score representing, at least in part, a relevance of that reference document with respect to the source document;
  based, at least in part, on the scores for the reference documents from at least two of the respective lists, selecting one or more of the reference documents having a respective score that meets a score threshold as potential duplicates of the same received source document that initiated the routine; and
  storing an identification of the one or more potential duplicate documents.

10. The non-transitory computer-readable storage medium of claim 9, said operations further comprising:

prior to said executing the two or more different queries, determining one or more of the different queries based on at least one of a term, word, or phrase within the source document.

11. The non-transitory computer-readable storage medium of claim 9, said operations further comprising:
prior to said executing the two or more different queries, determining one of more of the different queries based on a set of stored queries.

12. The non-transitory computer-readable storage medium of claim 9, wherein at least one of the different queries is configured to score a reference document based on the reference document's relevance with respect to the source document and on a number of reference documents identified by the at least one query's respective list of documents.

13. The non-transitory computer-readable storage medium of claim 9, the operations further comprising:
prior to said determining that one or more reference documents are potential duplicates of the received source document, determining that a reference document is identified in two or more of the lists of documents, the two or more lists of documents having a respective different score for the reference document; and
assigning the highest of the different scores to the reference document.

14. The non-transitory computer-readable storage medium of claim 9, wherein the score threshold is a relative score threshold applied to a collection of the identified reference documents.

15. A computer system, comprising:
a memory that, during operation, stores instructions; and
a processor that, during operation, retrieves instructions from the memory and executes at least some of the instructions to cause the computer system to:
initiate, based on receipt of a source document, a routine for identification of one or more candidate duplicate documents of the source document from a document corpus, said identification comprising:
receive the source document, wherein a document type of the source document is the same as a document type of at least some of a plurality of reference documents in the document corpus;
determine a plurality of queries from content of the source document;
execute the plurality of queries on the document corpus, wherein the plurality of queries includes:
a first query configured to return a first list of reference documents that identifies at least some of the plurality of reference documents of the document corpus, wherein reference documents in the first list are associated with scores representing at least in part relevance with respect to the source document;
a second query different from the first query by at least one search term from the first query and configured to return a second list of reference documents that also identifies at least some of the plurality of reference documents of the document corpus, wherein reference documents in the second list are associated with scores representing at least in part relevance with respect to the source document;
based, at least in part, on scores for the reference documents for the first and second list, select one or more of the reference documents having a respective score that meets a score threshold as potential duplicates of the same received source document that initiated the routine; and
store an identification of the one or more potential duplicate documents.

16. The system of claim 15, wherein at least some of the instructions further cause the computer system to:
prior to said execution of the plurality of queries, determine at least one of the plurality of queries based on at least one of a term, word, or phrase within the source document.

17. The system of claim 15, wherein at least some of the instructions further cause the computer system to:
prior to said execution of the plurality of queries, determine at least one of the plurality of queries based on a set of stored queries.

18. The system of claim 15, wherein at least one of the plurality of queries is configured to score a reference document based on the reference document's relevance with respect to the source document and on a number of reference documents identified the at least one query's respective list of documents.

19. The system of claim 15, wherein at least some of the instructions further cause the computer system to:
prior to said determination that one or more reference documents are potential duplicates of the received source document, determine that a reference document is identified in the first and second lists of documents, the first and second lists of documents having a respective different score for the reference document; and
assign the highest of the different scores to the reference document.

20. The system of claim 15, wherein the score threshold is a relative score threshold applied to reference documents in the first and second lists of documents.

\* \* \* \* \*